United States Patent [19]
Smith

[11] 3,774,169
[45] Nov. 20, 1973

[54] DATA STORAGE AND COLOR ANALYSIS SYSTEMS

[76] Inventor: Kenneth F. Smith, 3241 Flowerdale Lane, Dallas, Tex. 75229

[22] Filed: Feb. 8, 1971

[21] Appl. No.: 113,271

[52] U.S. Cl. .............. 340/173 LT, 178/15, 315/8.5, 346/110

[51] Int. Cl. .............. G11c 11/42

[58] Field of Search .............. 340/173 CR, 173 LM, 340/173 LT, 324 A, 324 AD; 315/8.5; 328/123; 346/107, 110; 353/25; 178/15; 179/100.3 K

[56] References Cited

UNITED STATES PATENTS

| | | | |
|---|---|---|---|
| 3,404,221 | 10/1968 | Loughren | 178/5.2 R |
| 3,603,962 | 9/1971 | Lechner | 340/173 CR |
| 3,284,663 | 11/1966 | Stocker | 315/8.5 X |
| 2,922,987 | 1/1960 | Haugk | 340/173 LM |
| 2,834,005 | 5/1958 | Ketchledge | 340/173 LM |
| 2,931,936 | 4/1960 | Burgett, Jr. | 315/8.5 X |
| 3,281,151 | 10/1966 | Kaprelian et al. | 179/100.3 K |
| 3,466,389 | 9/1969 | Neiswander et al. | 179/100.3 K |
| 3,501,586 | 3/1970 | Russell | 178/15 |
| 3,579,252 | 5/1971 | Goodman | 340/324 AD |

*Primary Examiner*—Stanley M. Urynowicz, Jr.
*Attorney*—Giles C. Clegg, Jr. and Richard E. Bee

[57] ABSTRACT

A digital-to-analog converter mechanism converts multiple-bit digital data bytes into single-bit analog bytes which control the color and intensity of light produced at different elemental locations on the display screen of a color cathode-ray tube. The display screen image is recorded on color photographic film. Readout of the recorded film data is accomplished by scanning the color film with a beam of white light and using a set of photomultiplier tubes with color-selective filters to reconstruct replicas of the original analog signals. These analog signals are supplied to an analog-to-digital converter mechanism to reconstruct replicas of the original multiple-bit digital data bytes. The basic readout apparatus is also useful as a color analyzer for analyzing plural-color specimens of different substances.

12 Claims, 4 Drawing Figures

KENNETH F. SMITH
*INVENTOR*

Giles C. Clegg Jr.
Jack A. Kanz
Richard E. Bee
*ATTORNEY*

PATENTED NOV 20 1973 3,774,169

SHEET 2 OF 2

KENNETH F. SMITH
*INVENTOR*

Giles C. Clegg Jr
Jack A. Kanz
Richard E. Bee
*ATTORNEY*

DATA STORAGE AND COLOR ANALYSIS SYSTEMS

BACKGROUND OF THE INVENTION

This invention relates to data storage systems, data recorders and data readers for use with digital computers and other digital data processing apparatus. This invention also relates to color analyzers for analyzing various types of plural-color specimens.

At the present time, punched cards, magnetic tapes and magnetic discs are used for storing much of the data used by digital computers. The limitations of punched cards are well known. With respect to magnetic tapes and discs, on the other hand, the stored data is subject to impairment or destruction in the event that an extraneous magnetic field should be brought into proximity to the magnetic medium. This might occur, for example, as as act of deliberate sabotage. In addition to this vulnerability, the use of magnetic tapes and magnetic discs creates a physical storage problem where relatively large amounts of data are to be recorded and stored because such tapes and discs are relatively bulky. Furthermore, such tapes and discs and the drive mechanisms therefor are relatively expensive in terms of cost and relatively slow in terms of the operating speed capability of the computer proper.

In various medical, industrial and research type applications, it would frequently be advantageous to have some form of automatic device for analyzing a plural-color specimen and providing the results of such analysis in a form which can be fed directly into a digital computer or other digital data processing apparatus. As far as is known, there are no entirely satisfactory devices of a general purpose character which are available on the commercial market for accomplishing such purposes.

It is an object of the invention, therefore, to provide a new and improved data storage system which is not susceptible to destruction by extraneous magnetic fields.

It is another object of the invention to provide a new and improved data storage system which enables storage of relatively large amounts of data in a relatively small physical volume.

It is a further object of the invention to provide a new and improved data storage system wherein substantial economies in the cost of data storage are achieved.

It is an additional object of the invention to provide a new and improved data storage system capable of providing a faster operating speed than many of the more commonly used present day data storage systems.

It is yet another object of the invention to provide a new and improved color analyzer for rapidly analyzing a relatively wide variety of physical and chemical specimens.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENTS

Figures 1, 2:
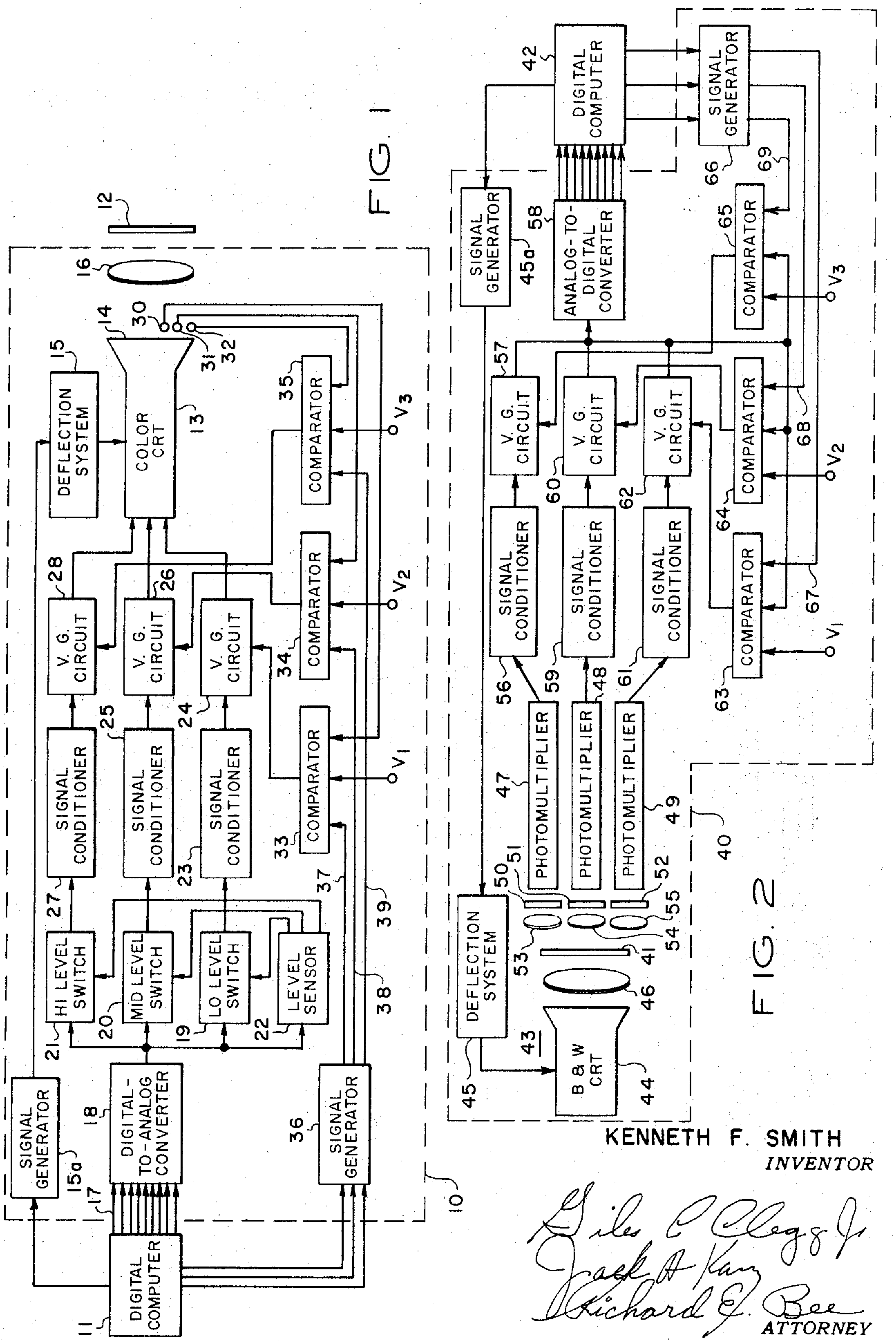
FIG. 1 is a block diagram of a first embodiment of a data recorder constructed in accordance with the present invention.
FIG. 2 is a block diagram of a data reader for use with the recorder of FIG. 1.

Referring to FIG. 1, there is shown a data recorder 10 for use with a digital computer 11 for purposes of recording data on a plural-color photographic film 12. For sake of example only, it will be assumed that film 12 is a three color film and that the three colors are red, green and blue. The data recorder 10 includes means for producing light in a plurality of colors and intensities. This light producing means is represented by a color cathode ray tube 13 having an internal electron beam generating means (not shown) and a plural-color phosphor screen or display screen 14 for producing light images in different colors. For sake of example only, it will be assumed that the cathode ray tube 13 is a three-color three-gun shadow mask type color television picture tube and that the colors of the three sets of phosphor dots are red, green and blue, it being clearly understood that the invention is not limited to this particular choice of colors.

The data recorder 10 also includes means for exposing elemental areas of the color film 12 with the light from the display screen 14 of the cathode ray tube 13. This film exposing means includes an electron beam deflection system 15 for deflecting the three electron beams within the cathode ray tube 13 across the display screen 14 in a predetermined scanning pattern which may be, for example, the line-type pattern used in present-day television systems. As such, deflection system 15 may take one of the forms known in the television arts. The film exposing means further includes an optical system, represented schematically by lens 16, for focusing the light produced on display screen 14 onto the color film 12. For sake of storing the data in as compact a manner as possible, optical system 16 is preferrably constructed to focus the total picture area of display screen 14 into an extremely small area on the film 12.

The data recorder 10 further includes means for converting groups of digital data bits appearing on the parallel output lines 17 of the digital computer 11 into analog signals. This converting means is represented in the present embodiment by a digital-to-analog converter 18.

The data recorder 10 includes means for enabling the analog signals produced by converter 18 to control the color and intensity of the light produced by the cathode ray tube 13. In the present embodiment, this enabling means includes amplitude sensitive signal separator means for splitting apart and separating into different signal channels the analog signal portions falling within different amplitude ranges. This signal separator means includes a low-level switch 19, a mid-level switch 20 and a high-level switch 21, each having its input coupled to the output of converter 18. Each of these switches 19 – 21 is controlled by a control signal from a level sensor 22. At any given instant, only one of the switches 19 – 21 is closed or conductive so as to pass signals from its input to its output, the other two switches being in an open or non-transfer condition. The particular switch which is closed or conductive at any given instant is determined by the level sensor 22. For purposes of explanation, it is assumed that the signal at the output of converter 18 can vary from zero volts to some predetermined maximum or full-scale voltage value. If the amplitude of the signal portion at any given instant falls within the lower one-third of the full-scale amplitude range, the level sensor 22 turns on the low-level switch 19, the other two switches remaining in an off or nonconductive condition. If the signal amplitude is in the middle one-third of the full scale range, then mid-level switch 20 is turned on. Similarly, if the signal amplitude is within the upper one-third of the full-scale range, then the high-level switch 21 is turned on. Thus, switches 19 – 21 and level sensor 22 serve to separate the different signal portions into different signal channels according to their amplitude values. Level sensor 22 may include, for example, a pair of Schmitt trigger circuits, having their respective tripping levels set at the low-to-mid range and the mid-to-high range boundaries, respectively, together with suitable logic circuitry coupled to the outputs thereof for energizing the appropriate one of the three output lines from the level sensor 22.

Low-level signal portions from the low-level switch 19 are transferred by way of a signal conditioner 23 and a variable gain circuit 24 to a first of the three electron guns within the cathode ray tube 13 for purposes of controlling the intensity of light produced by the phosphor dots of the particular color (e.g., red) which are activated by such electron gun. Signal amplitude portions appearing at the output of the mid-level switch 20 are transferred by way of a signal conditioner 25 and a variable gain circuit 26 to a second of the electron guns in the cathode ray tube 13 for controlling the intensity of the light produced by the phosphor dots of the particular color (e.g., green) activated by such second electron gun. Similarly, the analog signal amplitude portions appearing at the output of the high-level switch 21 are transferred by way of a signal conditioner 27 and a variable gain circuit 28 to the third electron gun within the cathode ray tube 13 for controlling the intensity of light produced by the phosphor dots of the particular color (e.g., blue) activated by such gun.

Each of the signal conditioners 23, 25 and 27 serves to adjust the base level and amplitude range of the signals supplied thereto so as to provide an output signal which accommodates the operating requirements of the cathode ray tube 13. Assume, for sake of example only, that the signal amplitude at the output of high-level switch 21 can vary between six and nine volts and that the corresponding electron gun in the cathode ray tube 13 preferably operates over a range of 0 to 20 volts. Signal conditioner 27 is then constructed to convert the 6 to 9 volt range into a 0 to 20 volt range. As such, signal conditioner 27 includes the appropriate clamping and clipping circuitry for shifting the base level of the signal and the appropriate gain changing circuitry for adjusting the size of the amplitude range. The other signal conditioners 23 and 25 perform a corresponding function for their respective amplitude ranges.

The data recorder 10 further includes automatic control means responsive to the light produced by the cathode ray tube 13 at prescribed points during the scanning operation for adjusting the signal transfer characteristics for the three analog signal channels to establish and maintain a predetermined overall calibration for the recording process. This automatic control means includes signal adjusting means, represented by the variable gain circuits 24, 26 and 28, which are coupled in series in the signal transfer paths or signal channels for the three sets of analog signals. This automatic control means further includes light sensitive means represented by color selective light sensors 30, 31 and 32 which are mounted in front of the display screen 14 for sensing the light intensity produced at selected locations thereon. Each of the sensors 30 – 32 responds to a different one of the primary colors produced on the display screen 14.

The automatic control means further includes comparator means, represented by comparators 33, 34 and 35, for individually comparing the signals produced by the different ones of the light sensors 30 – 32 with respective ones of predetermined reference signals $V_1$, $V_2$ and $V_3$, the latter being individually supplied to the different ones of the comparators 33, 34 and 35. Any error signals generated by comparators 33, 34 and 35 are supplied back to the corresponding ones of the variable gain circuits 24, 26 and 28 for purposes of adjusting the gains thereof so as to cause the signals produced by the corresponding ones of the light sensors 30, 31 and 32 to become equal in value to the corresponding ones of the reference voltages $V_1$, $V_2$ and $V_3$. Operation of comparators 33, 34 and 35 is gated by means of gating signals obtained from a signal generator 36 and supplied thereto over lines 37, 38 and 39. In between the occurrence of such gating signals, the comparators 33, 34 and 35 hold their output signals at the values established during the last previous calibration interval. The operation of signal generator 36 is controlled by digital signals supplied thereto at the appropriate moments by the digital computer 11.

At the beginning of each recording frame (corresponding to one complete scanning of the display screen 14), the digital computer 11 transmits over data lines 17 a series of reference signals for purposes of calibrating the recorder 10. Each reference signal preferably corresponds in value to the middle of one of the three signal amplitude ranges for the three switches 19, 20 and 21. The reference signal sequence may be, for example, low, middle, high, low, middle, high, low, middle, high. During the occurrence of each low range reference signal, a gating pulse is supplied by the signal generator 36 to the low-range comparator 33 for purposes of activating same. This enables the comparator 33 to make any necessary adjustments in the gain of variable gain circuit 24 so that the intensity of the particular color of light sensed by the sensor 30 corresponds to the desired standard middle value for the low range. Similarly, comparators 34 and 35 are activated by gating pulses from the signal generator 36 during the occurrence of the respective ones of the corresponding mid-range and high-range calibration signals at the input to the converter 18. This calibration process helps insure that the light intensities recorded on the photographic film 12 are properly standardized so that a given intensity value on different film specimens or different film frames will always represent the same signal value. As such, reference voltages $V_1$, $V_2$, and $V_3$ are preferrably obtained from either standard voltage sources of the type supplied by the National Bureau of Standards or from accurate and highly regulated voltage sources.

The digital computer 11 is programmed to synchronize by means of signal generator 15a the operation of the deflection system 15 with the supplying of the multiple-bit data signals or data bytes to the digital-to-analog converter 18 so that each data byte will determine the color and intensity of a signal elemental location display screen 14. In the ideal case, the spot size for the elemental location for each data byte may be made to correspond as nearly as possible to the size of a single phosphor dot trio on the display screen 14. Thus, each multiple-bit digital byte from the computer 11 is converted into a one-bit byte on the display screen 14, the value of such byte being represented by its color and intensity. In the present embodiment, switches 19, 20 and 21 allow activation of only one electron gun at a time. Consequently, each elemental data location on the display screen 14 will contain only one of the three primary or basic colors, as opposed to a mixture of two or more such basic colors. The resulting data spots produced on the display screen 14 are recorded on the color film 12 to produce a permanent record thereof. After the exposure thereof is completed, the color film 12 is developed or processed in the normal manner by means of the usual chemical solutions.

For automatically recording more than one film frame, the color film 12 can take the form of a long length of film and can be provided with an advancement mechanism for advancing it from one frame position to the next following the recording of each complete data frame. In such case, the advancement mechanism would be controlled by synchronizing signals provided by the digital computer 11.

Referring now to FIG. 2, there is shown a data reader 40 for reading data recorded in elemental areas on a plural-color photographic film 41 and converting same into digital data bytes for use by a digital computer 41 or other appropriate digital data processing apparatus. The particular embodiment shown in FIG. 2 is constructed for use in reading a color photographic film 41 having data spots recorded thereon in the manner described for the data recorder 10 of FIG. 1. As will be discussed hereinafter, the apparatus of FIG. 2 is also useful as a color analyzer for purposes of analyzing various types of plural-color physical specimens.

Considering first its use as as a reader, the apparatus of FIG. 2 includes means for sensing the color values recorded on the color film 41 and producing a plurality of analog signals individually representing the intensities of at least two different component colors recorded in the elemental areas on such film 41. This sensing means includes means for scanning the color film 41 with a beam of white light. Such scanning means comprises a flying spot scanner 43 which includes a black-and-white cathode ray tube 44 and an electron beam deflection system 45 for deflecting the electron beam in the cathode ray tube 44 back and forth across the phosphor screen thereof in a predetermined raster pattern. The phosphor on the phosphor screen of cathode ray tube 44 is of the short persistance type so that only a small moving spot of white light appears on such phosphor screen at any given instant. This light spot is focused onto the film 41 by an optical system represented by lens 46.

The color sensing means further includes a plurality of color-selective light sensing means for receiving scanning light passing through the photographic film 41 and individually producing separate analog signals for the different component colors. Such light sensing means includes a set of three photomultiplier tubes 47, 48 and 49 and a set of three color-selective optical filters 50, 51 and 52 for individually filtering the light before it reaches the different respective ones of the photomultiplier tubes 47, 48 and 49. Each of the filters 50, 51 and 52 passes a different one of the three basic colors. Optical systems represented by lenses 53, 54 and 55 serve to focus the film image onto the photosensitive elements in the different ones of the photomultiplier tubes 47, 48 and 49. Thus, photomultiplier tube 47 produces an analog signal corresponding to the intensity of a first basic color (e.g., blue) recorded at each point on the film 41, while photomultiplier tube 48 produces an analog signal corresponding to the intensity of a second basic color (e.g., green) recorded at each point on the film 41 and photomultiplier tube 49 produces an analog signal corresponding to the intensity of the third basic color (e.g., blue) recorded at each point on the photographic film 41.

The analog signal appearing at the output of photomultiplier 47 is supplied by way of a signal conditioner 56 and a variable gain circuit 57 to an analog-to-digital converter 58 which serves to convert such analog signal into groups of digital data bits which are, in turn, supplied to the digital computer 42. Similarly, the analog signal at the output of the second photomultiplier 48 is supplied by way of a signal conditioner 59 and a variable gain circuit 60 to the analog-to-digital converter 58. Likewise, the analog signal at the output of the third photomultiplier 49 is supplied by the way of a signal conditioner 61 and a variable gain circuit 62 to the converter 58.

Signal conditioners 56, 59 and 61 include the appropriate clamping circuitry for adding the proper direct-current offset values (corresponding to the offsets for the different amplitude ranges used in the recorder) to the individual analog signals and the appropriate gain changing circuitry for adjusting the signal amplitude ranges to fit the requirements of the analog-to-digital converter 58. In addition, each of the signal conditioners 56, 59 and 61 is provided with an output switch such that its output line will remain at zero volts except at such times as its output signal falls within its corresponding one of the three amplitude ranges. For use with the FIG. 1 recorder, these amplitude ranges are abutting but non-overlapping, in which case, a signal voltage should appear at the input of only one of the signal conditioners 56, 59 and 61 at any given instant, the outputs of the other two remaining at zero volts.

The data reader 40 further includes automatic control means responsive to the analog signals at prescribed points during the sensing or readout operation for adjusting the signal transfer characteristics for the analog signal channels for calibrating the operation of the data reader 40. This automatic control means includes signal adjusting means represented by the variable gain circuits 57, 60 and 62 previously considered. This automatic control means further includes comparator means represented by comparators 63, 64 and 65 and responsive to the analog signals being supplied to the converter 58 for comparing same with predetermined reference signals during the calibration intervals and adjusting the variable gain circuits 57, 60 and 62 as may be necessary to provide the proper calibration for the apparatus. The comparator inputs to which the reference voltages are supplied are designated as $V_1$, $V_2$ and $V_3$. These reference voltages are obtained from either standard or regulated voltage sources. Voltage $V_1$ is equal in value to the middle value for the low-level amplitude range, $V_2$ is equal to the middle value for the mid-level amplitude range and $V_3$ is equal to the middle value for the high-level amplitude range, where such amplitude ranges are the same as used in the data recorder 10 when expressed in terms of fractions of the full-scale range at the circuit point being considered.

Comparators 63, 64 and 65 are of the gated type and are activated at appropriate points during the readout operation by means of gating pulses produced by a signal generator 66 and supplied thereto over lines 67, 68 and 69. More particularly, comparators 63, 64 and 65 are separately activated at the beginning of each film frame at the same moments the photomultipliers 47, 48 and 49 are sensing the respective ones of the calibration signals recorded on the film 41. Considering, for example, comparator 63, such comparator is activated during the scanning of the recorded low-range calibration data by the flying spot produced by cathode ray tube 44. Comparator 63 compares this low-range calibration signal, as it appears at the output of variable gain circuit 62, with the $V_1$ reference signal and if these two signals are not equal in amplitude, the comparator 63 alters the value of the control signal being applied to the variable gain circuit 62 so as to bring them into equality. When in a deactivated condition, the output of comparator 63 remains at the adjustment value existing at the end of the last previous low-range calibration interval. Comparators 64 and 65 function in a similar manner for their respective signal channels.

Operation of the signal generator 66 is controlled by digital signals supplied thereto at the appropriate moments by the digital computer 42. So is the operation of a signal generator 45a which supplies synchronizing pulses to the deflection system 45. The digital computer 42 is programmed so that the synchronizing pulses supplied to the deflection system 45 serve to synchronize the scanning of the cathode ray tube light spot with the operation of the digital computer 42 in terms of accepting input signals.

As seen from the foregoing, the operation of the data reader of FIG. 2 is, to a large extent, the reverse of the operation of the data recorder of FIG. 1. The light spot produced by cathode ray tube 44 scans the film 41 in a line-by-line manner and photomultipliers 47, 48 and 49 produce analog output signals which vary in amplitude in accordance with the light intensities for the corresponding ones of the three basic component colors in the different elemental areas on the film 41. These analog signals are supplied to the analog-to-digital converter 58 which operates to convert same back into digital data bytes corresponding to the digital data bytes originally supplied to the input of the data recorder of FIG. 1.

Figure 3:
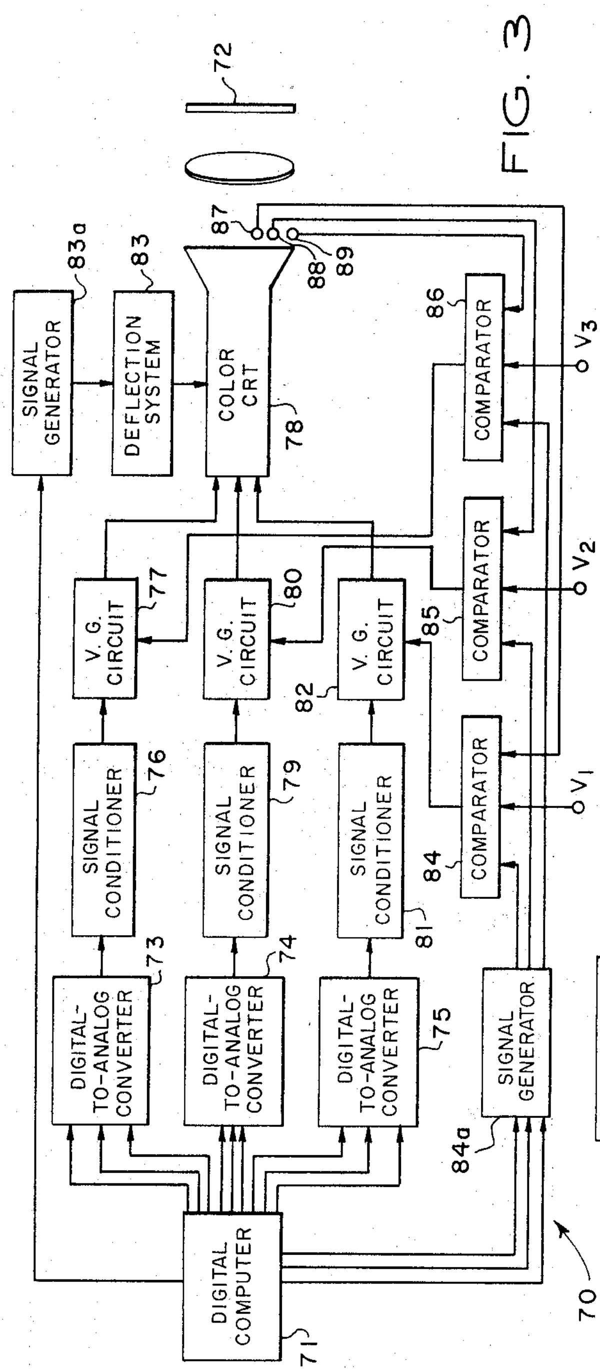
FIG. 3 is a block diagram of a second embodiment of a data recorder constructed in accordance with the present invention.

Referring now to FIG. 3, there is shown a somewhat different form of data recorder 70 for use with a digital computer 71 or other appropriate digital data processing apparatus for recording data on a color photographic film 72. Among other things, data recorder 70 differs from the data recorder of FIG. 1 in that the recorder 70 includes a set of three digital-to-analog converters 73, 74 and 75 for individually and separately converting different subgroups of each multiple-bit data byte into separate analog signals. This is accomplished by connecting different subgroups of the parallel bit data lines from the computer 71 to the inputs of different ones of the converters 73, 74 and 75.

The subgroup analog signal from converter 73 is supplied by way of a signal conditioner 76 and a variable gain circuit 77 to a first of the electron guns in a color cathode ray tube 78 for purposes of controlling the intensity of light produced by the phosphor dots of the particular color activated by such gun. Similarly, the subgroup analog signal produced by the converter 74 is supplied by way of a signal conditioner 79 and a variable gain circuit 80 to a second electron gun in the color cathode ray tube for purposes of 78 for the intensity of light produced by the phosphor dots of a second one of the three basic colors. Likewise, the third subgroup analog signal appearing at the output of converter 75 is supplied by way of a signal conditioner 81 and a variable gain circuit 82 to the third electron gun in the color tube 78 for purposes of controlling the intensity of light produced by the phosphor dots of the third one of the three basic colors. An electron beam deflection system 83 controls the deflection of the three electron beams across the display screen of the color tube 78, the resulting light images produced on such display screen being focused on and recorded by the color film 72. The operation of deflection system 83 is synchronized by a signal generator 83*a* which is, in turn, controlled by the digital computer 71.

Since the three analog signal channels running from the three converters 73, 74 and 75 to the three electron guns in the color tube 78 are continuously operative, more than one electron gun may be activated at any given instant. As a consequence, the spot at any given elemental location on the display screen of the color tube 78 may assume an intermediate color representing a mixture of two or more of the component primary colors. The intensity of each primary component at any given location will, of course, be determined by the amplitude of its corresponding one of the three different subgroup analog signals.

Comparators 84, 85 and 86, in conjunction with color-selective light sensors 87, 88 and 89, perform a calibration function in the same manner as performed in the FIG. 1 embodiment. Such comparators 84, 85 and 86 are activated at the appropriate moments by gating pulses supplied by a signal generator 84*a*.

Figure 4:
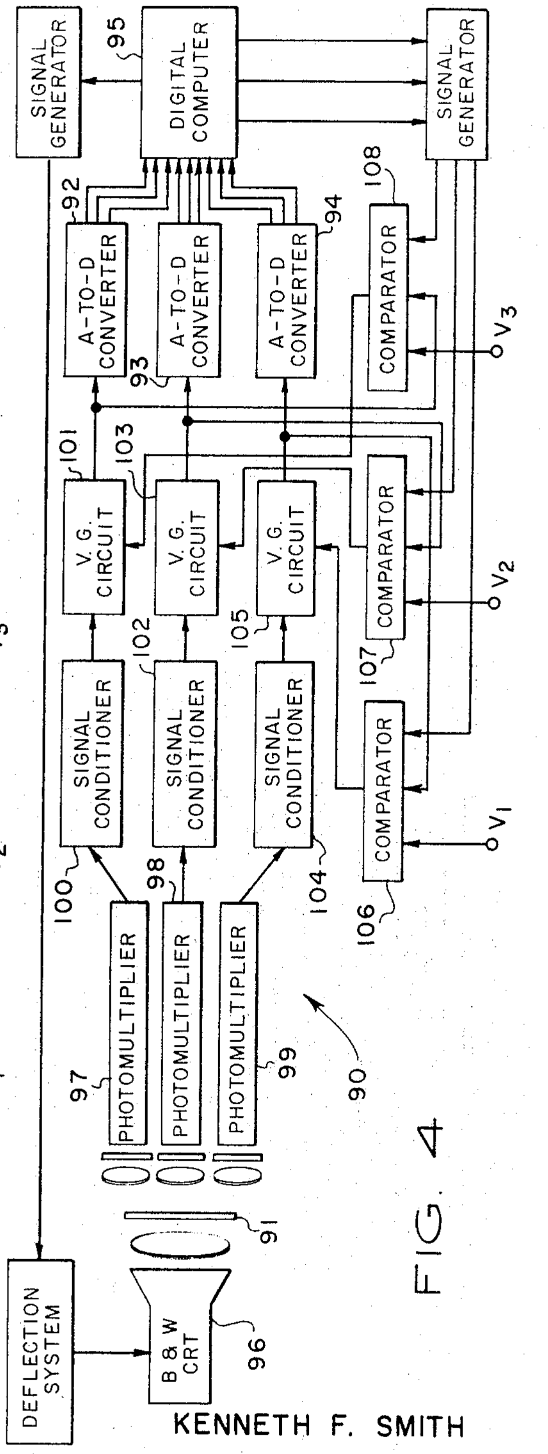
FIG. 4 is a block diagram of a data reader for use with the recorder of FIG. 3.

Referring to FIG. 4, there is shown a modified form of data reader 90 for reading data recorded on a color photographic film 91 by means of a data recorder which operates in the manner described in FIG. 3. The construction and operation of the data reader of FIG. 4 is pretty much the same as that of the data reader of FIG. 2 with a principal difference being that each of the three analog signal channels is provided at its output end with its own individual one of a set of three analog-to-digital converters 92, 93 and 94. The subgroup bit lines from these converters 92, 93 and 94 are connected to a digital computer 95 or other appropriate digital data processing apparatus for utilizing the same.

In FIG. 4, black-and-white cathode ray tube 96 scans the color film 91 with a spot of white light and photomultipliers 97, 98 and 99 produce analog output signals varying in amplitude in accordance with the intensities of the three basic component colors at each of the elemental data locations on the color film 91. A first of three separate analog signal channels is provided by photomultiplier 97, signal conditioner 100 and a variable gain circuit 101. A second signal channel is provided by photomultiplier 98, signal conditioner 102 and a variable gain circuit 103, the third signal channel is provided by photomultiplier 99, signal conditioner 104 and a variable gain circuit 105. Comparators 106, 107 and 108 are operative during the occurrence of calibration signals in the respective ones of the three analog signal channels for purposes of making any necessary adjustments in the variable gain circuits 101, 103 and 105 as may be required to make their outputs equal in value to their respective ones of the reference voltages $V_1$, $V_2$ and $V_3$.

For some applications, the overall data storage system of FIGS. 3 and 4 offers several advantages over the system of FIGS. 1 and 2. For one thing, the conversion time for the analog-to-digital converters 92, 93 and 94 in the FIG. 4 reader is considerably less than the conversion time for the analog-to-digital converter 58 in the FIG. 2 reader. For example, for the case of a nine bit data byte from the computer, the converter 58 must be capable of handling 512 different amplitude levels, while each of the converters 92, 93 and 94 in the FIG. 4 reader need only handle eight different amplitude levels. For another thing, the various signal conditioners in both the recorder of FIG. 3 and the reader of FIG. 4 may be of a simplier form of construction than the corresponding signal conditioners in the recorder of FIG. 1 and the reader of FIG. 2. This results largely from the fact that there in no need to remove and reinsert direct-current offset levels in the system of FIGS. 3 and 4.

As indicated earlier, the apparatus represented by the data readers of FIGS. 2 and 4 are also useful as color analyzers for analyzing various types of plural-color specimens. Such specimen may take the form of, for example, a blood smear obtained from a human blood test, a smear of polluted ocean water obtained in the vicinity of an oil spill or a sample of material obtained in connection with a wide variety of medical, chemical, industrial, biological, geological, oceanographic or the like type applications. For the FIG. 4 apparatus, for example, the blood smear or other specimen is mounted in the position occupied by the color film 91, such film, of course, being removed. The specimen is then scanned by the cathode ray tube 96 and the resulting primary color components of the color specimen are detected by the photomultipliers 97, 98 and 99. The resulting analog signals are converted to digital signals by converters 92, 93 and 94 and the latter signals are thereafter processed and analyzed by the digital computer 95 for purposes of, for example, determining the presence and amount of a particular constituent in the specimen. In other words, each constituent will have its own characteristic color and each characteristic color will produce a different digital number at the output of converters 92, 93 and 94. The various numbers thus obtained may then be tabulated and summarized by the computer 95 to provide an indication of the relative amounts of the different constituents. In the case of a blood sample, for example, this technique might be used to determine the concentration of white blood cells in the blood sample.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A data storage system comprising:

means for producing light in a plurality of colors and intensities;

means for exposing elemental areas of a plural-color photographic film with light from the light producing means;

means for converting groups of digital data bits into analog signals whose amplitudes are determined by the groups of digital data bits;

means for enabling the analog signals to control the color and intensity of the light produced by the light producing means, the intensity and color of the light being determined by the amplitude of the analog signals;

means for sensing the color valves recorded on the photographic film and producing a plurality of analog signals individually representing the intensities of at least one component color recorded in the elemental areas on such photographic film;

and means for converting each analog signal from the sensing means into a group of digital data bits whose value is determined by the color represented by the analog signal and by the amplitude of the analog signal.

2. A data recorder comprising:

means for producing light in a plurality of colors and intensities;

means for exposing elemental areas of a plural-color photographic film with light from the light producing means;

means for converting groups of digital data bits into analog signals whose amplitudes are determined by the groups of digital data bits;

and means for enabling the analog signals to control the color and intensity of the light produced by the light producing means, the intensity and color of the light being determined by the amplitude of the analog signals.

3. A data recorder in accordance with claim 2 wherein the light producing means is a color cathode ray tube having electron beam generating means and a plural-color phosphor screen for producing light images in different colors.

4. A data recorder in accordance with claim 3 wherein the exposing means includes an electron beam deflection system for deflecting the electron beam across the phosphor screen.

5. A data recorder in accordance with claim 4 wherein the exposing means further includes optical means for focusing the phosphor screen image onto the plural-color photographic film.

6. A data recorder in accordance with claim 4 wherein the converting means comprises a digital-to-analog converter and the enabling means includes amplitude sensitive signal separator means for separating analog signal portions falling within different amplitude ranges and means for enabling the signal portions for one amplitude range to control the intensity of light produced by the phosphors of one color and means for enabling the signal portions for another amplitude range to control the intensity of light produced by the phosphors of a different color.

7. A data recorder in accordance with claim 1 and further including signal conditioner means coupled intermediate the amplitude sensitive signal separator means and the color cathode ray tube for adjusting the levels and amplitude ranges of the separated signal portions to accommodate the operating requirements of the color cathode ray tube.

8. A data recorder in accordance with claim 4 wherein the converting means comprises a plurality of digital-to-analog converters for individually converting different subgroups of the digital data bits into different analog signals and the enabling means includes means for enabling one of the subgroup analog signals to control the intensity of light produced by the phosphors of one color and means for enabling another of the subgroup analog signals to control the intensity of light produced by the phosphors of a different color.

9. A data recorder in accordance with claim 8 and further including a plurality of signal conditioner circuits coupled intermediate the digital-to-analog converters and the color cathode ray tube for adjusting the levels and amplitude ranges of the different subgroup analog signals to accommodate the operating requirements of the color cathode ray tube.

10. A data recorder in accordance with claim 2 and further including automatic control means responsive to the light produced by the light producing means at prescribed points during the exposing operation for adjusting the enabling means as may be necessary to provide a predetermined calibration for the recording operation.

11. A data recorder in accordance with claim 4 and further comprising automatic control means including light sensitive means responsive to light produced by the color cathode ray tube, signal adjusting means coupled in circuit with the enabling means and comparator means for comparing signals produced by the light sensing means with predetermined reference signals and adjusting the signal adjusting means as may be necessary to provide a predetermined calibration for the recording operation.

12. A data reader for reading data recorded in elemental areas on plural-color photographic films comprising:

means for sensing the color values recorded on the photographic film and producing a plurality of analog signals individually representing the intensities of at least one component color recorded in the elemental areas on such photographic film;

means for converting each analog signal from the sensing means into a group of digital data bits; and automatic control means including signal adjusting means coupled intermediate the sensing means and the converting means in the signal transfer paths for the analog signals and comparator means responsive to the analog signals being supplied to the converting means for comparing same with predetermined reference signals at prescribed points during the sensing operation and adjusting the signal adjusting means to provide a predetermined calibration for the readout operations.

* * * * *

UNITED STATES PATENT OFFICE
CERTIFICATE OF CORRECTION

Patent No. 3,774,169 Dated November 20, 1973

Inventor(s) KENNETH F. SMITH

It is certified that error appears in the above-identified patent and that said Letters Patent are hereby corrected as shown below:

Column 2, line 54, after "10" and before "includes" insert --also--

Column 5, line 48, after "a" and before "reader" insert --data--

Column 11, line 1, "claim 1" should read --claim 6--

Signed and sealed this 15th day of May 1974.

(SEAL)
Attest:

EDWARD M.FLETCHER,JR.
Attesting Officer

C. MARSHALL DANN
Commissioner of Patents